Aug. 23, 1966  W. H. ISELY  3,267,755
CONTROL APPARATUS
Filed April 10, 1964
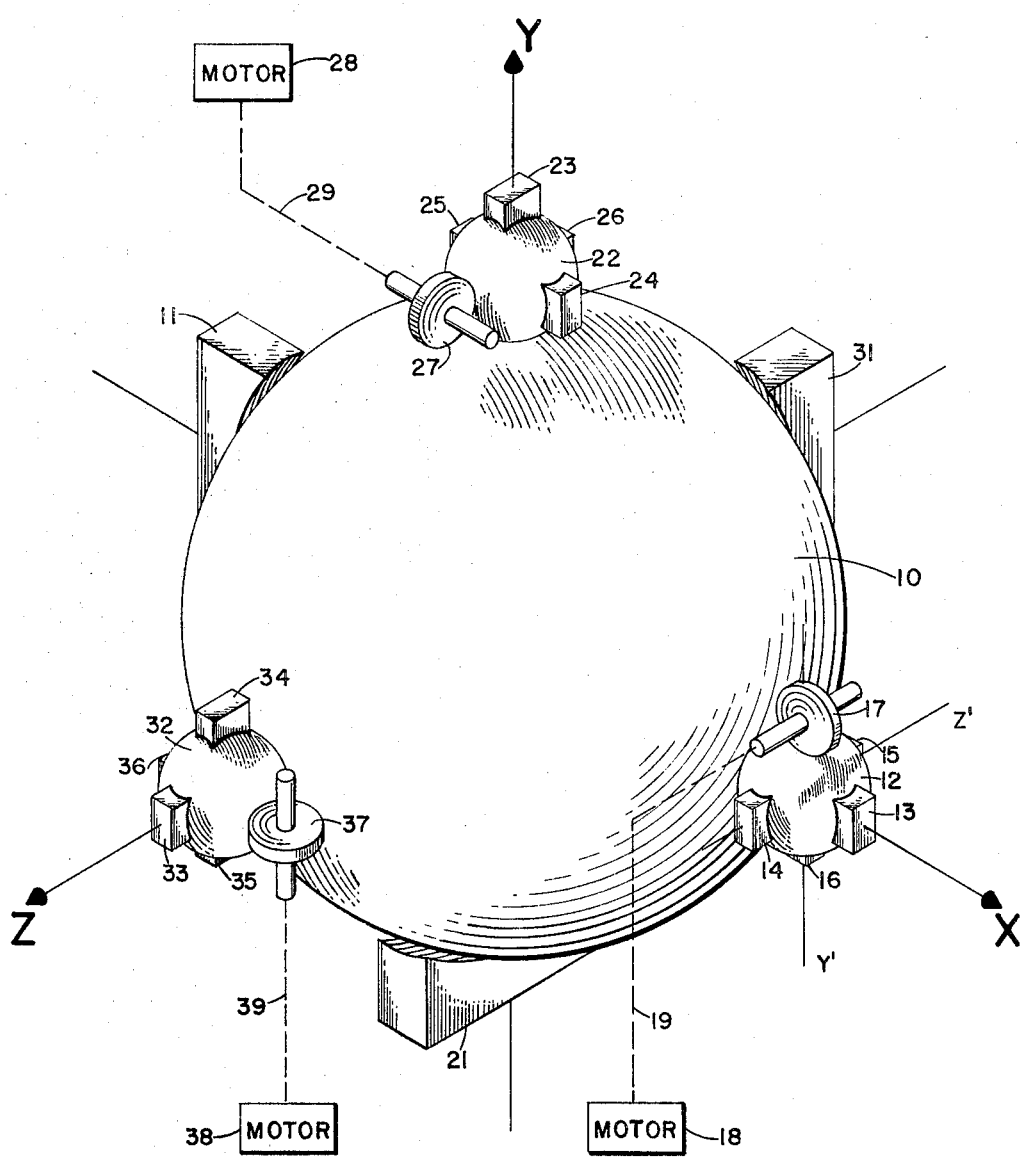
INVENTOR.
WILLIAM H. ISELY
BY Charles J. Ungemach
ATTORNEY United States Patent Office 3,267,755
Patented August 23, 1966

3,267,755
CONTROL APPARATUS
William H. Isely, Clearwater, Fla., assignor to
Honeywell Inc., a corporation of Delaware
Filed Apr. 10, 1964, Ser. No. 358,745
7 Claims. (Cl. 74—198)

This invention relates to control apparatus and more particularly to apparatus for driving a spherical element about any axis of the spherical element.

In prior art devices utilizing an attitude display device, such as a relatively large sphere having attitude indicating markings on the outer surface thereof, the sphere is mounted by means of one or two gimbals, depending upon the degrees of freedom required. These gimbals restrict the movement of the sphere and cause dead spots or areas on the sphere which cannot be observed or which are relatively meaningless.

In the present invention a spherical element is mounted for any axis rotation by bearing means or by fluid or electrical support pads. This means that there will not be any dead spots on the surface of the sphere since the spherical element can rotate freely about any of its axes. The apparatus for torquing the spherical element to the desired attitude consists of the following mechanism. At least three idler spheres are mounted for any axis rotation and so that they are in contact with the spherical element at points on the outer periphery which lie along three mutually orthogonal axes of the spherical element. Six idler spheres instead of three may be utilized to mount the main spherical element if it is desired. If six idler spheres are utilized all of them may be driven, in the manner to be described presently, or simply three of them may be driven while three act as bearing means at all times. Driving means, which may be three discs attached to three separate motors by rigid shafts, are mounted to rotate about three mutually orthogonal axes parallel to the previously mentioned three mutually orthogonal axes of the spherical element. Each of the discs is in contact with one of the idler spheres. The point of contact between the idler sphere and the driving disc is displaced 90° on the periphery of the idler sphere from the point of contact between the idler sphere and the spherical element.

Thus, in the present invention each of the driving means drives the spherical element, by means of an idler sphere, about one of the three orthogonal axes of the spherical element. When one of the driving means is driving the spherical element the other two idler spheres simply act as bearings and do not transmit any of the motion of the spherical element to their respective driving means. Also, the idler spheres produce very little resistance to motion about any axis except the axis about which they are utilized to drive the spherical element. Thus, a unique apparatus for supporting and driving a spherical element about any axis is disclosed.

Accordingly it is an object of this invention to provide an improved control apparatus.

Another object of this invention is to provide an improved torquing apparatus for spherical elements.

Another object of this inventon is to provide means for torquing a spherical element about any axis.

These and other objects of the present invention will be understood upon consideration of the accompanying specification, claims, and drawing of which:

The figure is a block diagram of the present invention.

In the figure, the numeral 10 designates a spherical element, which may be a display ball having markings indicative of attitude inscribed on the surface thereof or which may be utilized as a hand control to apply command signals indicative of a desired attitude to some motor means controlling the attitude of a craft or the like. Three mutually orthogonal axes of spherical element 10 are illustrated by the lines designated X, Y, and Z. In this particular embodiment the X and Z axes lie in the horizontal plane and the Y axis is vertical. A bearing pad 11 is centered over a point on the periphery of the spherical element 10 which lies on the X axis at the left hand side of spherical element 10. The bearing pad 11 is illustrated as a square boxlike structure with the side adjacent sphere 10 having an arcuate shape with the same curvature as spherical element 10 so that a narrow uniform gap is prevalent between bearing pad 11 and spherical element 10. It should be noted that the bearing pad 11 could contain ball bearings, air bearings, or any other type of suitable bearing means.

A smaller sphere 12, which is utilized as an idler element in a chain of driving elements, is mounted at the right hand side of the spherical element 10 so that it contacts the element 10 at a point along the X axis on the outer periphery of the spherical element 10. Idler sphere 12 is mounted by means of a plurality of bearing pads for rotation about any axis of idler sphere 12. In the figure a plurality of bearing pads 13 through 16, which are similar to bearing pad 11 except that the curved surface adjacent the idler sphere 12 has a smaller radius of curvature, are placed so that they center over points on the surface of the idler sphere 12 which are along X, Y′ and Z′, of the idler sphere 12 parallel to the X, Y and Z axes of the spherical element 10. Thus, bearing pad 13 is centered over a point on the X axis 180° from the point of contact between the idler sphere 12 and the spherical element 10. Two other bearing pads 14 and 15 are located 90° from the point of contact on either side of the idler sphere 12 and along the Z′ axis. A fourth bearing pad 16 is centered over a point on the Y′ axis at the bottom of the idler sphere 12. It should be noted that all of the bearing pads illustrated in the figure would be fixedly attached to a base but to simplify the drawing the base has been left out. Also, the bearing pads could be mounted at different locations or different numbers of bearing pads may be utilized and the ones shown are simply for illustrative purposes.

A driving member 17 which in the figure is illustrated as a simple disc-shaped member is mounted for rotation about an axis parallel to the Z axis and contacts the idler sphere 12 at a point along the Y′ axis on the periphery of the idler sphere 12 180° from the central point of the bearing pad 16. The point of contact between the disc 17 and the idler sphere 12 is 90° on the periphery of the sphere 12 from the point of contact between the spherical element 10 and the idler sphere 12. Thus when the disc 17 is rotated the idler sphere 12 will rotate about the Z′ axis which will in turn rotate the spherical element 10 about the Z axis. However, if the spherical element 10 is rotated about any other axis the idler sphere 12 simply acts as a bearing. For example, when the spherical element 10 is rotating about the X axis the point of contact between the spherical element 10 and the idler sphere 12 is on the X axis and, therefore, the spherical element 10 simply pivots on the point contact and no motion is transferred to the idler sphere 12. Also when the spherical element 10 is rotating about the Y axis the idler sphere 12 is rotated about the Y′ axis but since the point contact between the disc 17 and the idler sphere 12 is on the Y′ axis the idler sphere 12 simply pivots at the contact point on the disc 17. The disc 17 is driven by a motor 18, shown in block form, which is connected to the disc 16 by a mechanical connection, shown as dotted line 19 in the figure. Thus, when motor 18 is energized it drives disc 17 which in turn drives the spherical element 10, through the idler sphere 12, about the Z axis. It should be noted that if the present device is to be used as a manual control device a generator would be substituted for the motor 18 and the spherical element 10 will then drive the generator by means of the idler sphere 12 and disc 17 when it is manually rotated about the Z axis.

A bearing pad 21 is mounted at the bottom of the spherical element 10 and is centered over a point on the periphery of the spherical element 10 which lies on the Y axis. An idler sphere 22 similar to the idler sphere 12 is mounted, by means of a plurality of bearing pads 23 through 26 placed similar to the bearing pads 13 through 16, to contact the spherical element 10 at a point on the periphery along the Y axis and 180° from the central point of the bearing pad 21. A disc 27 is mounted to rotate about an axis parallel to the X axis and contacts the idler sphere 22 at a point on the periphery along an axis of the sphere 22 parallel to the Z axis. The point of contact between the disc 27 and the sphere 22 is 90° on the periphery of the sphere 22 from the point of contact between the spherical element 10 and the sphere 22. The disc 27 is driven by a motor 28 which is mechanically connected to the disc. The mechanical connection between the motor 28 and the disc 27 is shown in the figure as a dotted line 29 to simplify the figure. Thus, when the motor 28 is energized the disc 27 drives the spherical element 10, through the idler sphere 22, about the X axis.

A bearing pad 31 is mounted on the right hand side of the spherical element 10 and is centered over a point on the periphery which lies on the Z axis. An idler sphere 32 is mounted by means of bearing pads 33 through 36 for rotation about any of its axes and so that it contacts the spherical element 10 at a point on the periphery of the spherical element 10 along the Z axis 180° from the bearing pad 31. The bearing pads 33 through 36 are similar to the bearing pads 13 through 16 and are disposed about the idler sphere 32 in a similar fashion. A disc 37 is mounted for rotation about an axis parallel to the Y axis and contacts the idler sphere 32 at a point on its periphery along an axis of the idler sphere 32 parallel to the X axis. The point of contact between the disc 37 and the sphere 32 is 90° on the periphery of the sphere 22 from the point of contact between the spherical element 10 and the sphere 22. A motor 38 drives the disc 37 through a mechanical connection, which is illustrated by the dotted line 39 in the figure. Thus, when motor 38 is energized the disc 37 is rotated about an axis parallel to the Y axis and drives the spherical element 10, through the idler sphere 32, about the Y axis. The idler spheres 12, 22 and 32, and the driving discs 17, 27 and 37, should be composed of material having a relatively high coefficient of friction to insure slippage in the driving links.

In the operation of the present invention, when the spherical element 10 is being driven about one of the axes, X, Y, or Z, the idler spheres mounted along the other two axes act as bearings rather than a part of a driving chain. Thus, when the spherical element 10 is being driven about one axis, the driving means for the other axes are isolated from the system and are not affected by the energized driving means. For example, assume that motor 38 is energized and is driving disc 37. Disc 37 causes idler sphere 32 to rotate thereby driving the spherical element 10 about the Y axis. Since the idler sphere 22 is mounted to contact the spherical element 10 at a point on the Y axis the spherical element 10 simply pivots on a point on the periphery of idler sphere 22 and there is no motion transmitted from the spherical element 10 to the idler sphere 22. Also, the rotation of the spherical element 10 about the Y axis causes the idler sphere 12 to rotate about the axis Y' parallel to the Y axis. Since the idler sphere 12 is rotating about the Y' axis and since the driving disc 17 contacts the idler sphere 12 at a point on the periphery along the Y' axis, no motion is transferred from the idler sphere 12 to the disc 16.

Similarly, when motor 28 is energized the spherical element 10 is driven about the X axis. With this rotation no motion is transferred from the spherical element 10 to the idler sphere 12 and no motion is transferred from the idler sphere 32 to the driving disc 37. When motor 18 is energized the spherical element 10 is driven about the Z axis. With this mode of rotation no movement is transferred from the spherical element 10 to the idler sphere 32 and no movement is transferred from the idler sphere 22 to the driving disc 26. Thus, when the spherical element 10 is being driven about any of the axes X, Y or Z, no motion is transmitted to the remaining two driving means and, therefore, no errors are introduced into the system because of cross coupling.

While I have shown and described a specific embodiment of this invention, further modifications and improvements will occur to those skilled in the art. I desire it to be understood therefore that this invention is not limited to the particular form shown and I intend in the appended claims to cover all modifications which do not depart from the spirit and scope of this invention.

What is claimed is:

1. Apparatus for transferring rotary motion between members comprising:
   (a) a driven member;
   (b) a driving member; and
   (c) idler means mounted in substantially point contact with said driven member and said driving member, said point contact between said idler means and said driven member being spaced apart from said point contact between said idler means and said driving member, for transferring rotary motion from said driving member to said driven member about one axis of said driven member and acting substantially as a bearing for rotary motion of said driven member about all other axes of said driven member.

2. Apparatus for transferring rotary motion between members comprising:
   (a) a driven member;
   (b) a driving member; and
   (c) an idler sphere mounted in substantially point contact with said driven member and said driving member, said point contact between said idler sphere and said driven member being spaced from said point contact between said idler sphere and said driving member approximately 90° on the periphery of said idler sphere, for transferring rotary motion from said driving member to said driven member about one axis of said driven member and acting substantially as a bearing for rotary motion of said driven member about all other axes of said driven member.

3. Apparatus for transferring energy between a spherical element supported for any axis rotation and electrical signal means comprising:
   (a) first, second, and third idler spheres mounted for any axis rotation and cooperating with said spherical element for providing substantially point contacts between said idler spheres and said spherical element along three mutually orthogonal axes of said spherical element;
   (b) first, second, and third motion transferring means mounted, respectively, for rotation about three orthogonal axes parallel to said three orthogonal axes of said spherical element, said three motion transferring means being in contact with said three idler spheres; and
   (c) electrical signal means connected to said motion transferring means.

4. Apparatus for driving a spherical element supported for any axis rotation comprising:
   (a) first, second, and third idler spheres mounted for any axis rotation and cooperating with said spherical element for providing substantially point contacts between said idler spheres and said spherical element along three mutually orthogonal axes of said spherical element;
(b) driving means mounted for rotation about three orthogonal axes parallel to said three orthogonal axes of said spherical element, said driving means being in contact with said three idler spheres; and
(c) electrical signal receiving means having an output connected to said driving means for energizing said driving means thereby controlling said spherical element to a position determined by the electrical characteristics of said output.

5. Electrical control signal generating apparatus comprising:
(a) a spherical element mounted for rotation about any axis of said element;
(b) first, second, and third idler spheres mounted for rotation about any axis of said idler spheres and cooperating with said spherical element for providing substantially point contacts between said idler spheres and said spherical element along three mutually orthogonal axes of said spherical element;
(c) first, second, and third motion transferring means mounted, respectively, for rotation about three orthogonal axes parallel to said three orthogonal axes of said spherical element, said three motion transferring means being in contact with said three idler spheres, and
(d) electrical signal generating means mechanically connected for energization by said three motion transferring means for providing electrical signals indicative of the rotation of said spherical element about each of said orthogonal axes of said spherical element.

6. Energy transferring apparatus comprising:
(a) a spherical element mounted for rotation about any axis of said element;
(b) first, second, and third idler spheres mounted for rotation about any axis of said idler spheres and cooperating with said spherical element for providing substantially point contacts between said idler spheres and said spherical element along three mutually orthogonal axes of said spherical element;
(c) first, second, and third motion transferring means mounted, respectively, for rotation about three orthogonal axes parallel to said three orthogonal axes of said spherical element, said three motion transferring means being in contact with said three idler spheres; and
(d) means connected to said motion transferring means for transducing between electrical and mechanical energy.

7. Attitude controlling apparatus comprising:
(a) a spherical element mounted for rotation about any axis of said element;
(b) first, second, and third idler spheres mounted for rotation about any axis of said idler spheres and cooperating with said spherical element for providing substantially point contacts between said idler spheres and said spherical element along three mutually orthogonal axes of said spherical element;
(c) first, second, and third driving means mounted in approximate point contact with said first, second, and third idler spheres, respectively, and for rotation about three orthogonal axes parallel to said three orthogonal axes of said spherical element, each said driving means being mounted in contact with a point on each said idler sphere spaced approximately 90° on the periphery of said idler sphere from the point contact between said idler sphere and said spherical element; and
(d) motor means having an input and connected to said driving means for energizing said driving means thereby controlling said spherical element to a position determined by the electrical characteristics of said input.

References Cited by the Examiner
UNITED STATES PATENTS 2,528,284 10/1950 Newell _____ 74—198 X
2,585,120 2/1952 Harrington _____ 74—198
2,800,720 7/1957 Kristiansen _____ 74—198 X DAVID J. WILLIAMOWSKY, *Primary Examiner.*

L. H. GERIN, *Assistant Examiner.*